US008462451B2

(12) United States Patent
Okuda

(10) Patent No.: US 8,462,451 B2
(45) Date of Patent: Jun. 11, 2013

(54) LENS BARREL AND IMAGE PICKUP APPARATUS

(75) Inventor: Toshihiro Okuda, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 1 day.

(21) Appl. No.: 13/290,566

(22) Filed: Nov. 7, 2011

(65) Prior Publication Data
US 2012/0113535 A1    May 10, 2012

(30) Foreign Application Priority Data

Nov. 8, 2010  (JP) ................................. 2010-249973

(51) Int. Cl.
 G02B 7/02    (2006.01)
 G02B 15/14    (2006.01)
(52) U.S. Cl.
 USPC ........... 359/823; 359/824; 359/694; 359/699; 359/700; 396/544
(58) Field of Classification Search
 USPC ............ 359/819, 822–826, 694–701; 396/79, 396/88, 534, 544; 348/340, 374; 310/323.02
 See application file for complete search history.

(56) References Cited

U.S. PATENT DOCUMENTS

| 5,461,445 | A | * | 10/1995 | Kikuchi | 396/544 |
| 6,369,962 | B1 | * | 4/2002 | Nomura et al. | 359/822 |
| 7,242,131 | B2 | * | 7/2007 | Kishi et al. | 310/323.02 |
| 7,268,464 | B2 | * | 9/2007 | Kishi | 310/323.02 |
| 7,466,504 | B1 | * | 12/2008 | Koyama | 359/819 |
| 7,903,346 | B2 | * | 3/2011 | Terada | 359/699 |
| 8,300,333 | B2 | * | 10/2012 | Ozawa et al. | 359/824 |

FOREIGN PATENT DOCUMENTS
JP    2009-251265 A    10/2009

\* cited by examiner

Primary Examiner — Loha Ben
(74) Attorney, Agent, or Firm — Rossi, Kimms & McDowell LLP

(57) ABSTRACT

A lens barrel includes a first cylinder, a second cylinder configured to rotate around an optical axis relative to the first cylinder and to move a lens holding frame holding a lens in an optical axis direction, a force unit arranged outside of the second cylinder, a force relay member arranged outside of the second cylinder and configured to contact the force unit, a first roller fixed to the force relay unit and configured to contact a first surface of the second cylinder, and to transmit a force to the first surface of the second cylinder, the force being applied by the force unit and relayed by the force relay unit; and a second roller fixed to the first cylinder, and configured to contact a second surface inside of the second cylinder, and to restrict a movement of the second cylinder in the optical axis direction by the force.

11 Claims, 7 Drawing Sheets

LENS BARREL AND IMAGE PICKUP APPARATUS

BACKGROUND OF THE INVENTION

1. Field of the Invention

The present invention relates to a lens barrel and an image pickup apparatus.

2. Description of the Related Art

A lens barrel mounted on an image pickup apparatus, such as a single-lens reflex camera, includes a mechanism configured to move a lens holding frame that holds a lens, in an optical axis direction. For example, Japanese Patent Laid-Open Application No. ("JP") 2009-251265 arranges, via balls, a first holder at one end of a cam cylinder configured to move the lens holding frame in the optical axis direction, and a force unit, a ring, balls, and a second holder at the other end of the cam cylinder. The cam cylinder, the force unit, and the ring are rotatable relative to the first holder.

However, according to JP 2009-251265, the force unit and the ring that relays the force applied by the force unit rotate with the cam cylinder, a large driving load (inertia moment) is applied when the lens holding frame is driven in the optical axis direction. As a result, when the driving force is constant, the acceleration or deceleration needs a long time and a long driving time period is necessary. Alternatively, a larger consumption power is necessary when a driving time period is constant.

SUMMARY OF THE INVENTION

Accordingly, the present invention provides a lens barrel and an image pickup apparatus, which can drive a lens with a small load.

A lens barrel according to the present invention includes a first cylinder, a second cylinder configured to rotate around an optical axis relative to the first cylinder and to move a lens holding frame in an optical axis direction through rotations, the lens holding frame being configured to hold a lens, a force unit arranged outside of the second cylinder, a force relay member arranged outside of the second cylinder and configured to contact the force unit, a first roller fixed to the force relay unit and configured to contact a first surface of the second cylinder, and to transmit a force to the first surface of the second cylinder, the force being applied by the force unit and relayed by the force relay unit, and a second roller fixed to the first cylinder, and configured to contact a second surface inside of the second cylinder, and to restrict a movement of the second cylinder in the optical axis direction by the force.

Further features of the present invention will become apparent from the following description of exemplary embodiments with reference to the attached drawings.

DESCRIPTION OF THE EMBODIMENTS

Figure 1A:
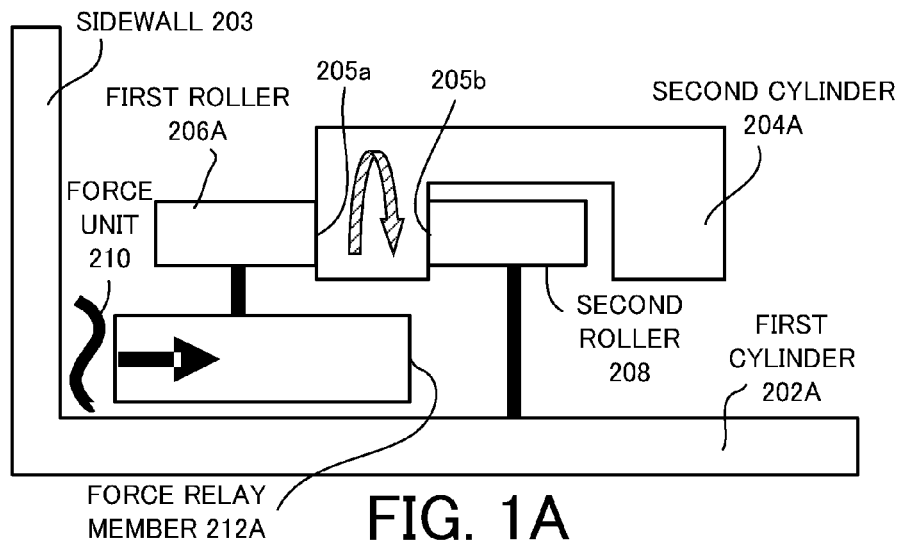
FIGS. 1A to 1C are block diagrams each illustrating a principal structure of a lens barrel according to this embodiment.
Figure 1B:
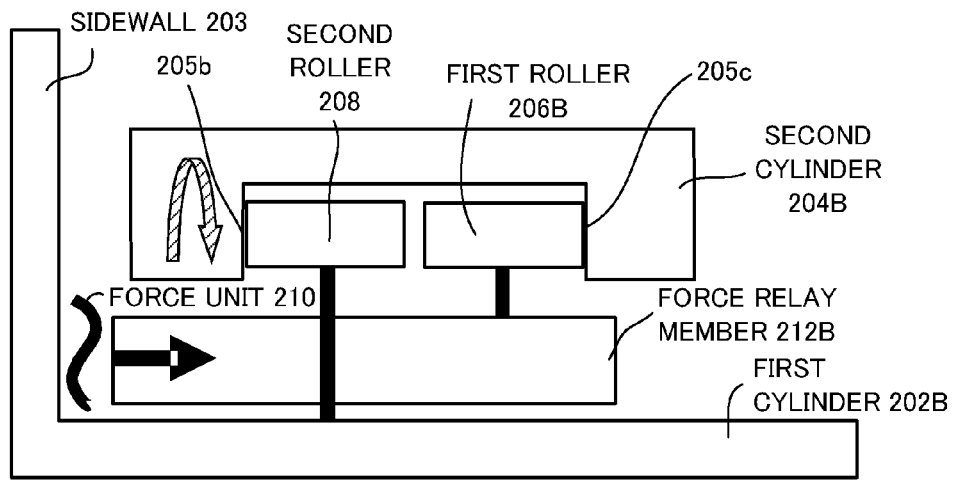
Figure 1C:
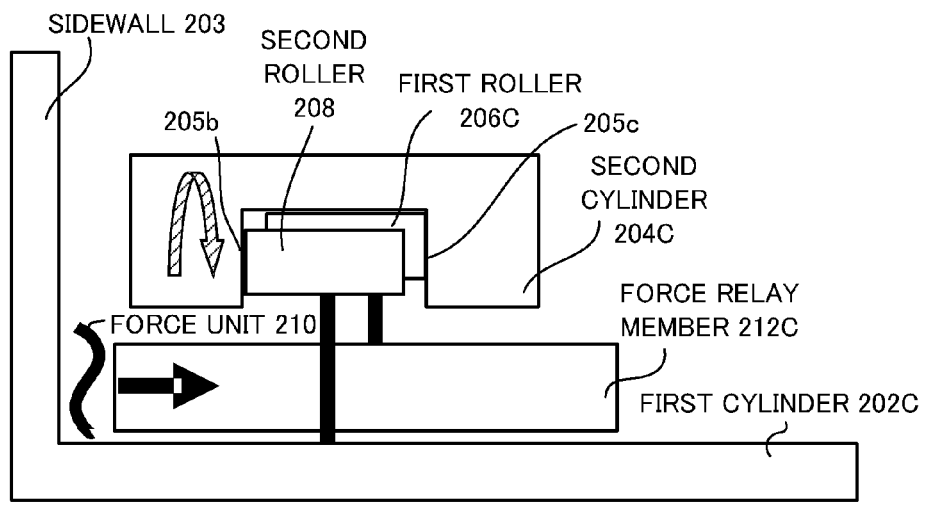

FIGS. 1A to 1C are block diagrams of different principal structures of a lens barrel according to this embodiment.

The lens barrel illustrated in FIG. 1A includes a first cylinder 202A, a second cylinder 204A, a first roller 206A, a second roller 208, a force unit 210, and a force relay unit 212A.

The second cylinder 204A, such as a cam cylinder, the second roller 208, the first roller 206A, the force unit 210, and the force relay member 212A are provided in the first cylinder 202A, such as a guide cylinder.

The second cylinder 204A is engaged with a lens holding frame configured to hold a lens (not illustrated), and rotates at a fixed place as illustrated by an arrow relative to the first cylinder 202A, and can move the lens holding frame in the optical axis direction through rotations.

The second roller 208 is provided inside of the second cylinder 204A, and the first roller 206A, the force unit 210, and the force relay member 212A are arranged outside of the second cylinder 204A. Conventionally, a rotator includes the second cylinder, the force unit, and the force relay member, and causes a large load (inertial moment), when the lens is driven. On the other hand, the lens barrel of this embodiment reduces the load when the lens holding frame (the second cylinder 204A) by is driven, by arranging the force unit and the force relay member outside of the rotator.

The first roller 206A and the second roller 208 contact the second cylinder 204A. A surface 205a of the second cylinder 204A which the first roller 206A contacts is an outer surface of the second cylinder 204A, and a surface 205b of the second cylinder 204A which the second roller 208 contacts is an inner surface of the second cylinder 204A.

The outer surface 205a and the inner surface 205b are front and back surfaces of the same portion of the second cylinder 204A. The front and back surfaces may be perpendicular to the optical axis direction, or one of them may be a conic surface. When it is made as a conic surface, the following biasing effect can be extended not only to the optical axis direction but also to a diameter direction of the second cylinder. The rolling load by the first roller 206A on the outer surface 205a and the rolling load by the second roller 208 on the inner surface 205b depend upon the rolling friction and thus are small.

The first roller 206A and the second roller 208 include, for example, a ball bearing or a ball lace in which its rotational axis is perpendicular to the optical axis of the lens barrel.

The first roller 206A is fixed onto the force relay member 212A, and the second roller 208 is fixed onto the first cylinder 202A. One end of the force unit 210 contacts a sidewall 203 of the first cylinder 202A, and its other end contacts the force relay member 212A configured to relay the force applied by the force unit 210. The force applied by the force unit 210 is transmitted to the second cylinder 204A via the first roller 206A. The second roller 208 restricts a movement of the second cylinder 204A in the optical axis direction by that force. This embodiment needs no holder configured to hold the first roller unlike the prior art, and can reduce the size of the lens barrel.

The lens barrel illustrated in FIG. 1B includes a first cylinder 202B, a second cylinder 204B, a first roller 206B, a second roller 208, a force unit 210, and a force relay unit 212B. The lens barrel illustrated in FIG. 1B is different from the lens barrel illustrated in FIG. 1A in that the first roller 206B is located inside of the second cylinder 204B.

In other words, the first roller 206B and the second roller 208 are located inside of the second cylinder 204B, and the force unit 210 and the force relay member 212B are provided outside of the second cylinder 204B. The first roller 206B and the second roller 208 contact the second cylinder 204B. A surface 205b of the second cylinder 204B which the second roller 208 contacts and a surface 205c of the second cylinder 204B which the first roller 206 contacts are different inner surfaces of sidewalls opposite to each other. Of course, as described above, these inner surfaces may be perpendicular to the optical axis direction, or one of them may be a conic surface.

While the first roller 206B is fixed onto the force relay member 212B, the shape and the arrangement of the force relay member 212B is different from those of the force relay member 212A, because the first roller 206B is arranged inside of the second cylinder 204B. The first cylinder 202B may have the same shape as that of the first cylinder 202A or different shape and size as those of the first cylinder 202A.

The lens barrel illustrated in FIG. 1C is different from the lens barrel illustrated in FIG. 1B in that the second cylinder 204B is made shorter and the second roller 208 and the first roller 206C are alternately arranged in the phase direction so that they overlap each other at least partially in the optical axis direction.

In other words, the first roller 206C and the second roller 208 are provided inside of the second cylinder 204C but they overlap each other at least partially. In this case, the second roller 208 and the first roller 206C may be alternately arranged in the circumferential direction.

The first roller 206C is fixed onto the force relay member 212C similar to the first roller 206B. However, the position of the first roller 206C in the second cylinder 204C is different from that of the first roller 206B in the second cylinder 204B, and thus the shape and arrangement of the force relay member 212C may be different from those of the force relay member 212B. The first cylinder 202C may be made smaller than the first cylinder 202B because the second cylinder 204 is made smaller.

First Embodiment

Figure 2:
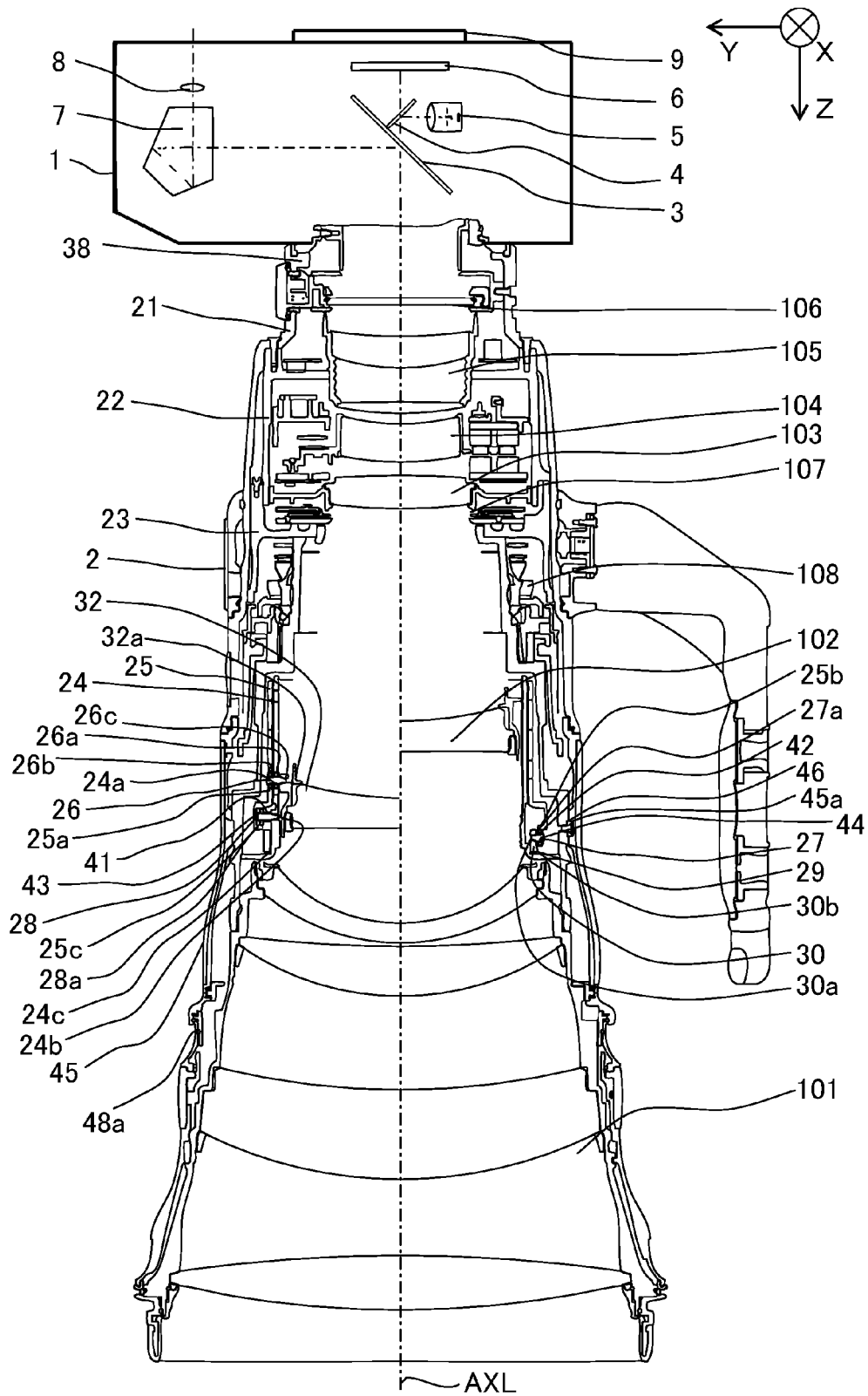
FIG. 2 is a sectional view of an image pickup apparatus according to a first embodiment.

FIG. 2 is a sectional view of a principal part when a lens barrel (replaceable lens) according to the first embodiment is applied to a lens replaceable type digital single-lens reflex camera (image pickup apparatus).

FIG. 2 sets a Z direction to a direction of a lens optical axis AXL ("image pickup optical axis" or simply referred to as an "optical axis" hereinafter), and an X direction to a lateral direction and a Y direction is set to a longitudinal direction among two directions parallel to the image pickup surface of an image pickup element 6 and orthogonal to the lens optical axis AXL.

Reference numeral 1 denotes a camera body (simply referred to as a "camera" hereinafter). Reference numeral 2 denotes a replaceable lens attached exchangeably to the camera 1. A structure of the camera 1 will now be described. In the state illustrated in FIG. 2, a main mirror 3 is arranged on an optical path of a light flux from the replaceable lens 2, and configured to reflect part of the light flux toward a viewfinder optical system (7, 8) and to transmit the remaining light flux.

A sub-mirror 4 is arranged behind (on the image side of) the main mirror 3, and reflects the light flux that has transmitted the main mirror 3 to a focus detecting unit 5. The main mirror 3 and the sub-mirror 4 are integrally inserted into and retreated from the optical path by a driver (not illustrated). The focus detecting unit 5 provides focus detections (or detects a focusing state of the replaceable lens 2) using the known phase-difference detecting method.

Reference numeral 6 denotes an image pickup element, such as a CCD sensor or a CMOS sensor, and an object image is formed by a light flux from the replaceable lens 2 on a light receiving surface (image pickup surface) of the image pickup element 6. The image pickup element 6 performs a photoelectric conversion for the formed object image, and outputs an image pickup signal. Reference numeral 9 denotes a display panel, and serves to display a variety of image pickup information and an image output from the signal processor (not illustrated) which has received the signal from the image pickup element 6.

The replaceable lens 2 includes, in order from the object side to the image side, a first lens unit 101, a second lens unit 102, a third lens unit 103, a fourth lens unit 104, a fifth lens unit 105, a sixth lens unit 106, and a diaphragm unit 107. The first lens unit 101 to the diaphragm unit 107 form part of an image pickup optical system. The replaceable lens 2 can move the focus (or zoom) lens in the optical axis direction by relatively moving the guide cylinder 24 and the cam cylinder 25, which will be described later.

The second lens unit 102 includes a focus lens that is movable in the optical axis direction by a driving force applied by a focus lens unit 108 for autofocus. The fourth lens unit 104 is movable in a direction perpendicular to the optical axis by a driving force applied by an image stabilizing unit (not illustrated). The sixth lens unit 106 can be retreated from and inserted into in the Y direction, and can be replaced with a polarization filter, etc. if necessary. The diaphragm unit 107 is arranged on the object side of the third lens unit 103, and configured to adjust a light quantity of a light flux headed for the camera 1. The replaceable lens 2 of this embodiment is an image pickup lens having a single focal length, but may be a zoom lens having a zooming function.

In the replaceable lens 2, reference numeral 21 denotes an exterior ring, replaceably fixed onto a mount 38 of the camera 1. Reference numeral 22 denotes a fixed cylinder fixed onto the exterior ring 21. Reference numeral 23 denotes an intermediate cylinder fixed onto the fixed cylinder 22.

Reference numeral 24 is a guide cylinder (first cylinder) fixed onto the focus unit 108, and includes a guide groove 24a, an attachment section 24b for the second roller 28, and a contact section 24c with the force unit 29. The guide groove 24a guides a straightforward movement of the second group lens unit (lens holding frame) 32 for autofocus.

Reference numeral 25 denotes a cam cylinder (second cylinder), and includes a cam groove 25a, a groove (not illustrated) engaged with an output part of the focus unit 108, a first surface 25b configured to contact the first roller 27, and a second surface 25c configured to contact the second roller 28. The cam cylinder 25 is arranged on the outer circumference side of the guide cylinder 24, and diameter-engaged with it at front and back ends.

Reference numeral 26 denotes a cam follower, and includes a first engagement member 26a engaged with the guide groove 24a of the guide cylinder 24, a second engagement member 26b engaged with the cam groove 25a of the cam cylinder 25, and a shaft member 26c onto which the second group barrel 32 is fixed. When the focus unit 108 is driven, a key section (not illustrated) as the output part of the focus unit 108 rotates around the optical axis, and the rotation is transmitted to the cam cylinder 25 via the key section and the groove of the cam cylinder 25. As the cam cylinder 25 rotates, the second group barrel 32 is moved in the optical axis direction in accordance with the guide groove 24a and the cam groove 25a via the cam follower 26.

The replaceable lens 2 includes a forcing cam follower (not illustrated) engaged with the guide groove 24a and the cam groove 25a and having a phase different from that of the cam follower 26. The forcing cam follower includes a first engagement member engaged with the guide groove 24a of the guide cylinder 24, a second engagement member engaged with the cam groove 25a of the cam cylinder 25, and a shaft member attached to a force block.

A force unit (not illustrated) is arranged between the force block and the second group barrel 32, and applies a repulsive power to the cam follower 26 and the forcing cam follower. Thereby, the cam follower 26 is biased against a surface of one of the guide groove 24a and the cam groove 25a. The "bias," as used herein, means putting aside the clearance between components to one side (such as in the optical axis direction or diameter direction).

Reference numeral 27 denotes a first roller, and includes a contact section configured to contact the first surface 25b of the cam cylinder 25 and fixed onto the attachment section 30a of the force relay member 30 via a second spacer 42 by a second shaft member 44 and a fastening method, etc.

Reference numeral 28 denotes a second roller, and includes a contact section 28a configured to contact the second surface 25c of the cam cylinder 25 and fixed onto the attachment section 24b of the guide cylinder 24 via a first spacer 41 by a first shaft member 43 and a fastening method, etc.

Reference numeral 29 denotes a force unit arranged between the contact section 24c of the guide cylinder 24 and the contact section 30b of the force relay member 30, and forces the force relay member 30 in the optical axis direction (−Z direction).

Reference numeral 30 denotes a force relay unit, and includes a contact section 30a configured to contact the second shaft member 44 attached to the first roller 27, and a contact member 30b configured to contact the force unit 29.

Reference numeral 32 denotes a second group barrel used for focusing, is a component of the second lens unit 102, and includes a seat 32a used to fix the cam follower 26.

Reference numeral 45 denotes a focus ring, and includes a circumferential groove 45a engaged with a roller 46 fixed onto the focus unit 108. The focus ring 45 is configured to restrict a movement of the roller 46 in the optical axis direction, and rotatably hold it. The focus ring 45 further includes an attachment section (not illustrated) for a shaft member (not illustrated) configured to transmit a rotation of the focus ring 45 to the focus unit 108.

The focus unit 108 includes a driving source (not illustrated), a key section (not illustrated), a shaft member (not illustrated) engaged with the shaft member attached to the focus ring 45, and an attachment unit (not illustrated) mounted with a detector configured to detect an angular velocity.

When the release button (not illustrated) of the camera 1 is pressed in the thus-structured lens barrel, autofocus and autoexposure are performed, and exposure of the image pickup element and recording of the obtained image follow.

Figure 3:
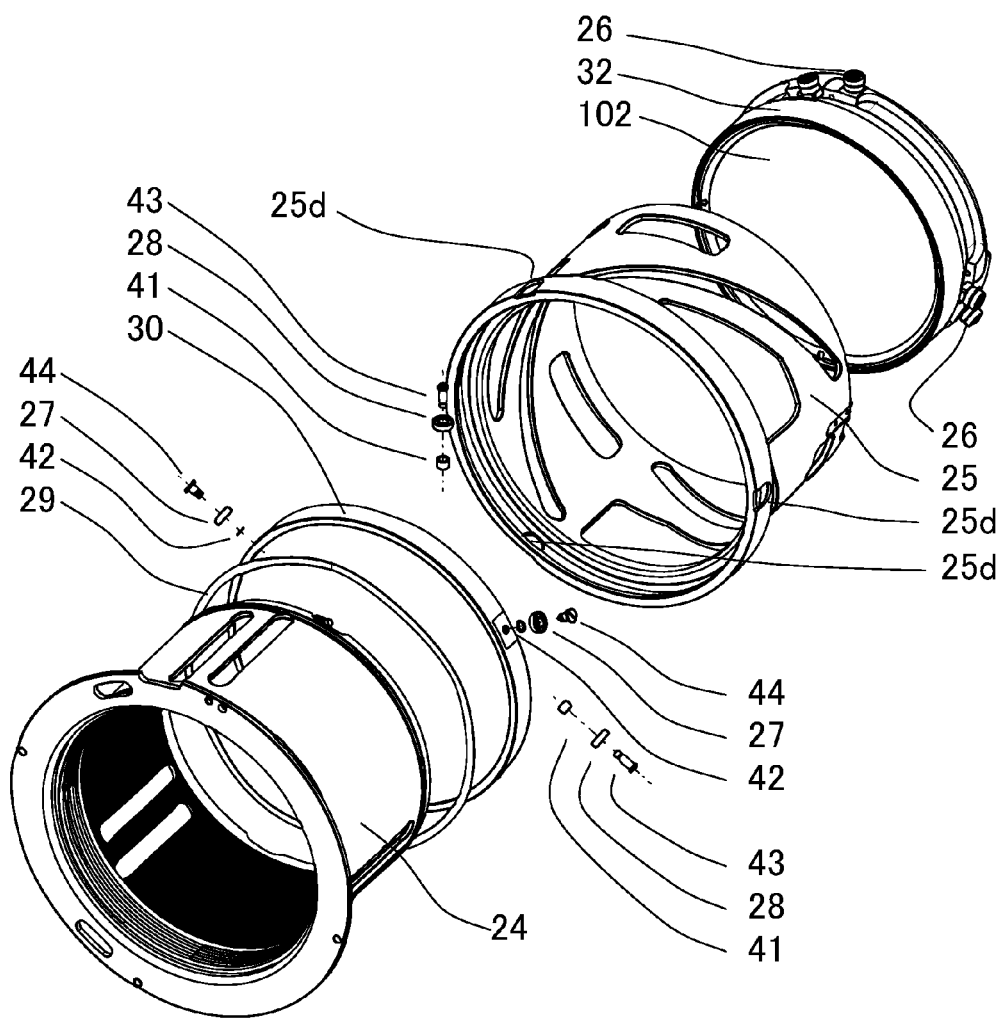
FIG. 3 is a partially perspective view of a lens barrel illustrated in FIG. 2 according to the first embodiment.
Figure 4:
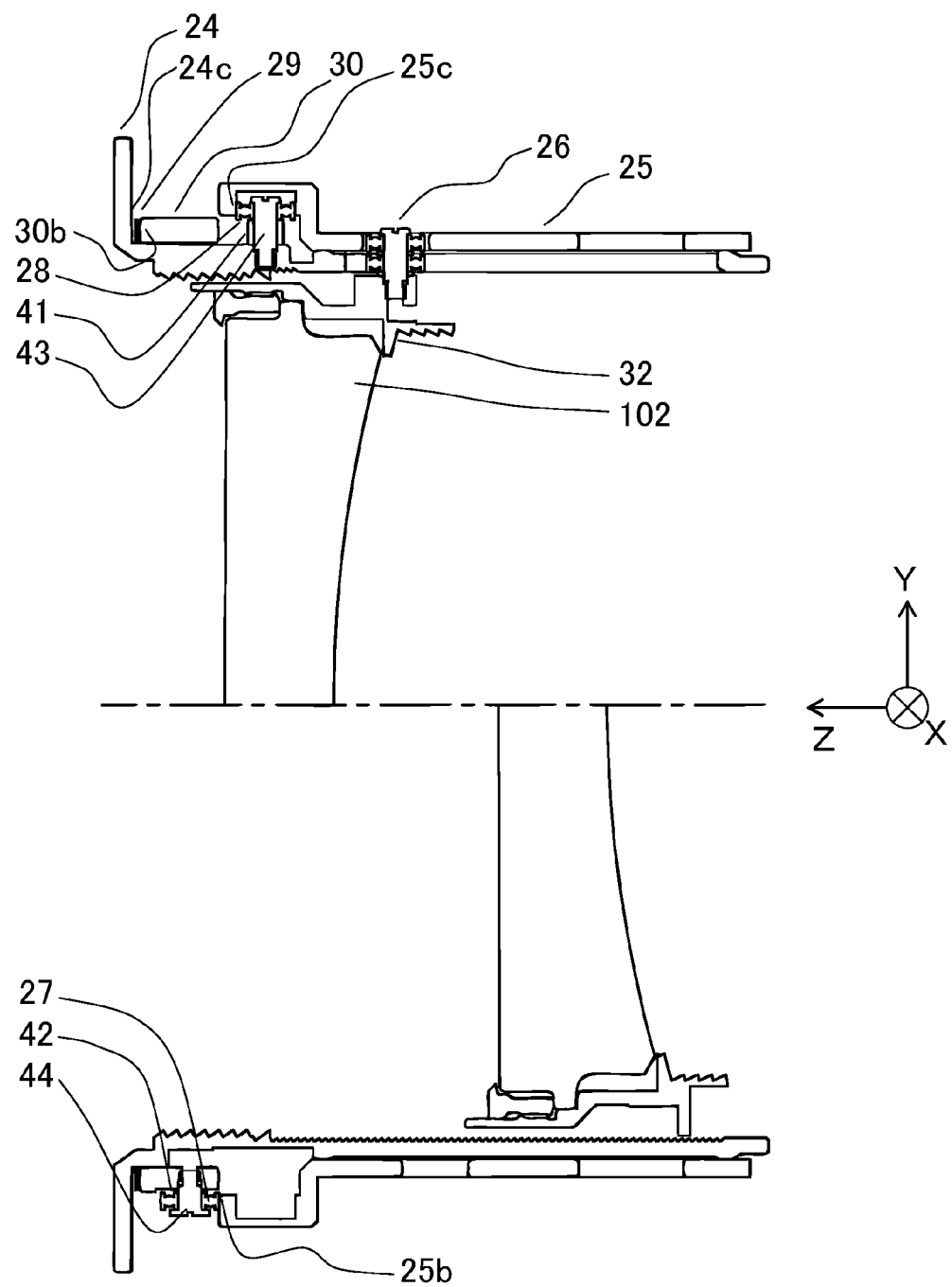
FIG. 4 is a partially sectional view of a lens barrel illustrated in FIG. 2 according to the first embodiment.

FIGS. 3 and 4 are perspective and sectional views of the principal parts of the replaceable lens 2 around the guide cylinder 24 and the cam cylinder 25. This illustration corresponds to the structure of FIG. 1A.

The cam cylinder 25 includes the cam groove 25a having a predetermined width in the circumferential direction, and the cam groove 25a is configured to move the second group barrel 32 in the optical axis direction when the cam groove 25a is rotated around the optical axis. The end surface of the cam cylinder 25 is the first surface 25b, and the inner surface of the cam cylinder 25 is the second surface 25c. This embodiment provides each of the first rollers 27 and the second rollers 28 at three locations and makes each of them as a bearing that is rotatable around a shaft perpendicular to the optical axis.

While the force unit 29 of this embodiment is a wave washer, a flat spring or a coil spring may be used. A forcing unit configured to apply a force in directions both separating the guide cylinder 24 from the force relay member 30 and bring them to each other can also provide a biasing function.

The cam cylinder 25 has an opening 25d used for assembly, and the second roller 28, the first spacer 41, and the first shaft member 43 are assembled through the opening 25d. The opening 25d may be provided at a phase outside a movable range of the second roller 28 and outside the cam groove 25a. This is because when there is a local deformation of the groove due to the working of the opening 25d, the deformation affects the positioning precision of the second group barrel 32.

The force relay member 30 is held so that it can move only in the optical axis direction relative to the guide cylinder 24. When the force relay member 30 is pressed in the −Z direction by the forcing member 29, the first roller 27 attached to the force relay member 30 contacts the first surface 25b of the cam cylinder 25 and presses the cam cylinder 25 in the −Z direction. When the cam cylinder 25 is forced in the −Z direction, it moves in that direction but then the movement of the cam cylinder 25 in the optical axis direction is restricted, because the second roller 28 fixed onto the guide cylinder 24 contacts the second surface 25c of the cam cylinder 25. As a result, the cam cylinder 25 is biased against the guide cylinder 24 in the −Z direction.

Since the cam cylinder 25 is always biased against the guide cylinder 24, the lens holding frame can be highly precisely held and moved. In addition, when the cam cylinder 25 is rotated around the optical axis, the force relay member 30, the force unit 29, the second roller 28, and the first roller 27 do not rotate around the optical axis, and thus the inertia moment (driving load) can be made smaller. Therefore, when the driving force is constant, a time period necessary to accelerate or decelerate the lens can be shortened and the driving time period can be shortened.

While this embodiment uses three first rollers 27 and three second rollers 28 for biasing, the present invention is not limited to this structure. Nevertheless, three sets are effective to biasing.

While this embodiment makes each of the first roller 27 and the second roller 28 of the bearing, balls may be arranged in the phase direction and retained by a retainer. Nevertheless, the bearing can improve the assembly operation and reduce the driving noises.

Second Embodiment

Figure 5:
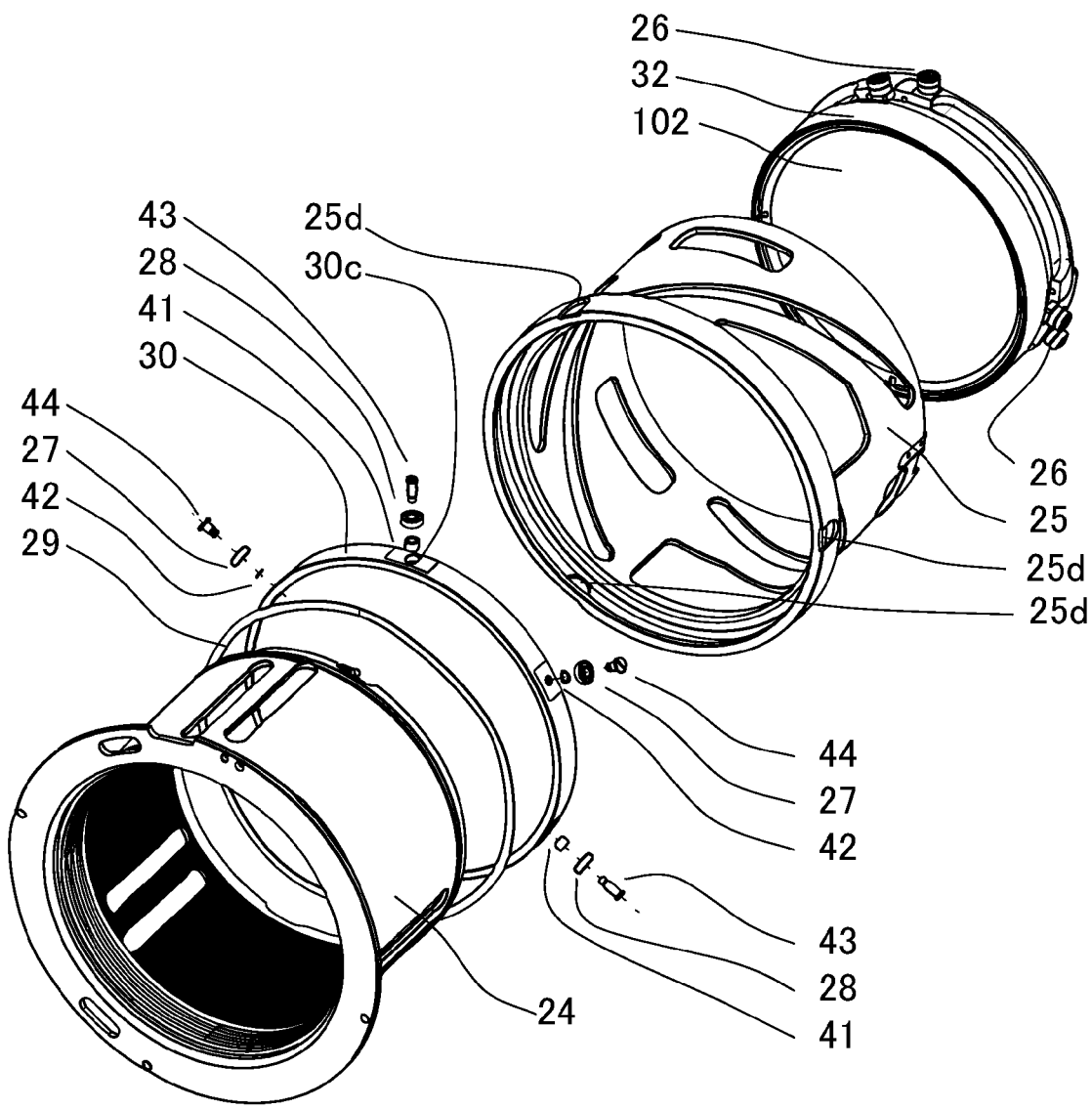
FIG. 5 is a partially perspective view of a variation of the lens barrel illustrated in FIG. 3 according to a second embodiment.
Figure 6:
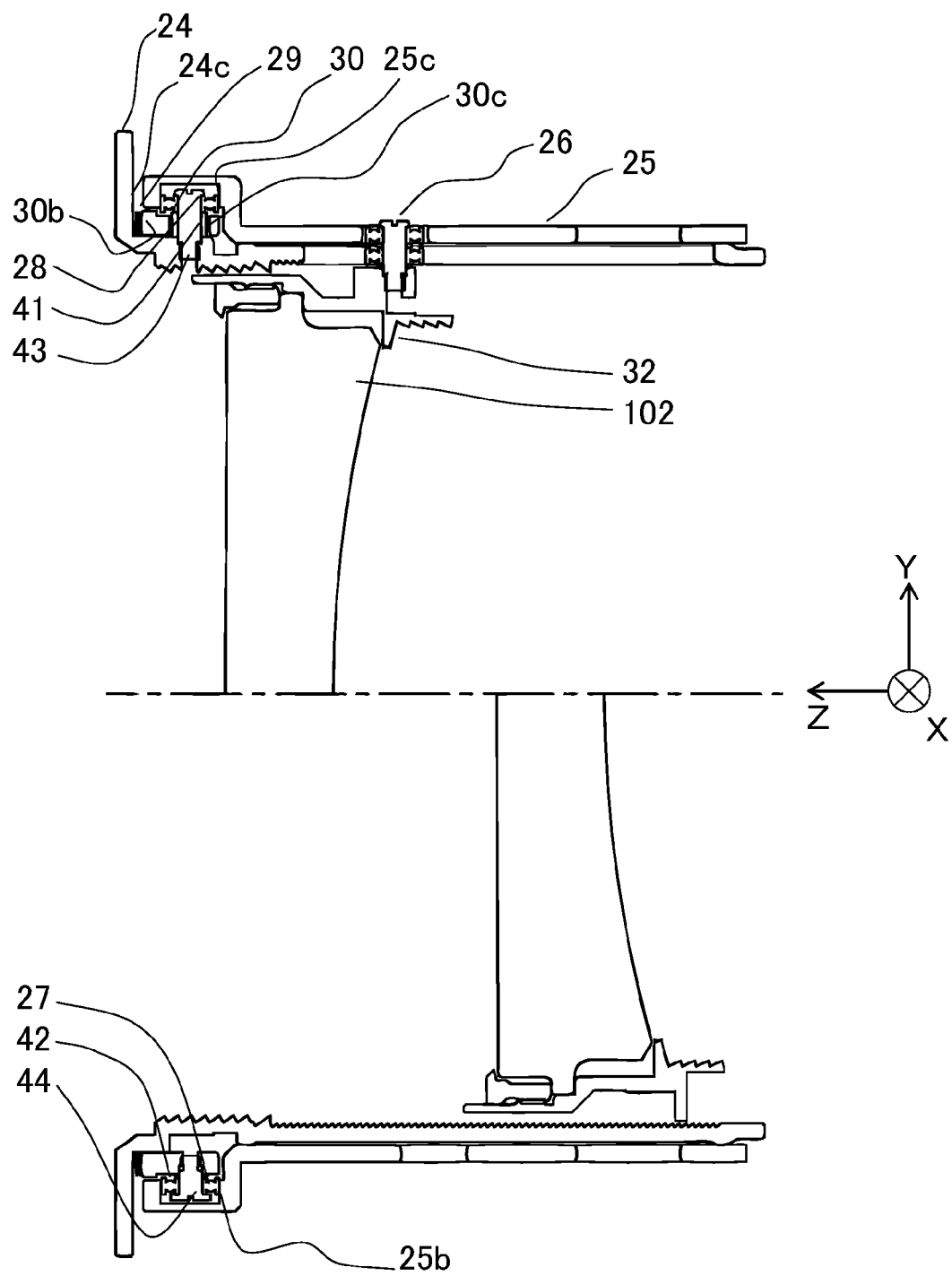
FIG. 6 is a partially perspective view of a variation of the lens barrel illustrated in FIG. 4 according to the second embodiment.

FIGS. 5 and 6 are perspective and sectional views of the principal parts of the lens barrel according to the second embodiment. This embodiment modifies shapes of the guide cylinder 24 and the force relay member 30 of the replaceable lens 2 of the first embodiment. The second embodiment corresponds to FIG. 1C. This embodiment provides the first surface 25b which the first roller 27 contacts, to a surface opposite to the second surface 25c of the groove of the cam cylinder 25, and arranges the first roller 27 and the second roller 28 alternately in the phase direction so that they overlap each other in the optical axis direction.

The force relay member 30 has holes 30c into which each first shaft member 43 is inserted at a phase among attachment sections of the second shaft member 44, and the rotation around the optical axis is restricted when the hole 30c is engaged with the first shaft member 43. In addition, similar to the first embodiment, the cam cylinder 25 has the opening 25d through which the first roller 27, the second roller 28, the first spacer 41, the second spacer 42, the first shaft member 43, and the second shaft member 44 are assembled in.

This embodiment has a biasing structure on a surface opposite to the guide groove of the cam cylinder 25 by arranging the first rollers 27 at phases between the second rollers 28, and can realize a miniaturization in the optical axis direction. In addition, since a larger lens driving amount can be secured when the space is maintained, a minimum image pickup distance can be reduced.

Third Embodiment

Figure 7:
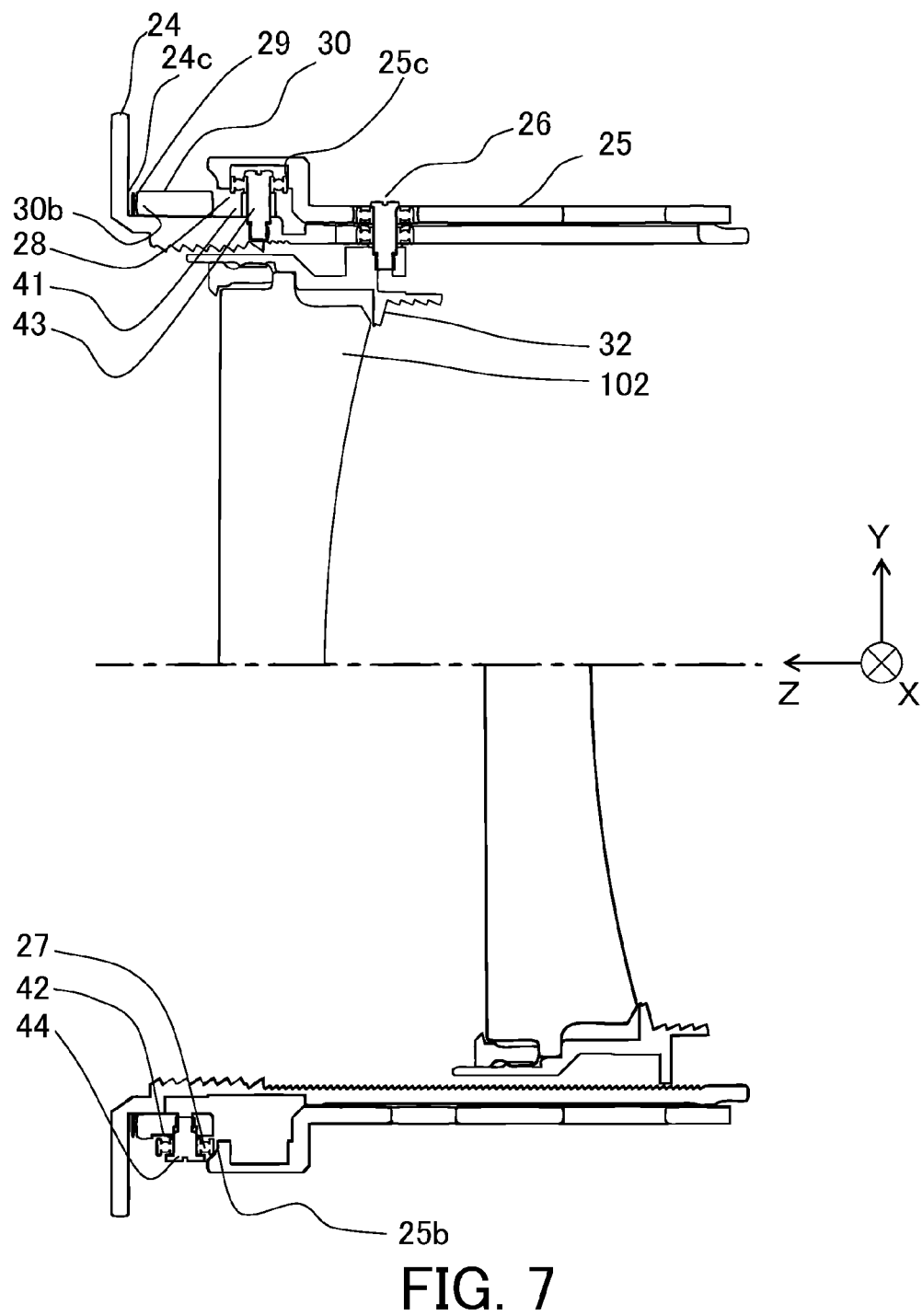
FIG. 7 is a partially perspective view of another variation of the lens barrel illustrated in FIG. 4 according to a third embodiment.

FIG. 7 is a sectional view of a lens barrel of the third embodiment. The third embodiment modifies the shape of the cam cylinder 25 of the replaceable lens 2 of the first embodiment by changing the first surface 25b of the cam cylinder 25 configured to contact the first roller 27 into a conic surface that inclines to the surface perpendicular to the optical axis. Thereby, the positional fluctuations in the diameter direction between the cam cylinder 25 and the guide cylinder 24 can be restrained, and the lens holding frame can be driven highly precisely. Moreover, frictions caused by sliding in the diameter direction between the cam cylinder 25 and the guide cylinder 24 can be eliminated and a driving time period can be made shorter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-249973, filed Nov. 8, 2010 which is hereby incorporated by reference herein in its entirety.

What is claimed is:

1. A lens barrel comprising:
a first cylinder;
a second cylinder configured to rotate around an optical axis relative to the first cylinder and to move a lens holding frame in an optical axis direction through rotations, the lens holding frame being configured to hold a lens;
a force unit arranged outside of the second cylinder;
a force relay unit arranged outside of the second cylinder and configured to contact the force unit;
a first roller fixed to the force relay unit and configured to contact a first surface of the second cylinder, and to transmit a force to the first surface of the second cylinder, the force being applied by the force unit and relayed by the force relay unit; and
a second roller fixed to the first cylinder, and configured to contact a second surface inside of the second cylinder, and to restrict a movement of the second cylinder in the optical axis direction by the force.

2. The lens barrel according to claim 1, wherein the first surface is an outer surface of the second cylinder.

3. The lens barrel according to claim 2, wherein the second cylinder includes a groove including the second surface configured to contact the second roller, and the first surface is opposite to the second surface in the optical axis direction.

4. The lens barrel according to claim 1, wherein the first surface is an inner surface of the second cylinder.

5. The lens barrel according to claim 4, wherein the second cylinder includes a groove including the first surface configured to contact the first roller and the second surface configured to contact the second roller, and the first surface is opposite to the second surface in the optical axis direction.

6. The lens barrel according to claim 5, wherein the first roller and the second roller are alternately arranged in a circumferential direction of the second roller, and partially overlap each other in the optical axis direction.

7. The lens barrel according to claim 1, wherein one of the first roller and the second roller has a conic surface that inclines to the optical axis direction.

8. The lens barrel according to claim 1, wherein the force unit is a wave washer.

9. The lens barrel according to claim 1, wherein each of the first roller and the second roller is a ball bearing.

10. The lens barrel according to claim 1, wherein one of the first cylinder and the second cylinder includes a cam groove engaged with a cam follower provided to the lens holding frame, and the other of the first cylinder and the second cylinder includes a guide groove engaged with the cam follower.

11. An image pickup apparatus comprising the lens barrel according to claim 1.

* * * * *